US005495273A

United States Patent [19]

Kitamura

[11] Patent Number: 5,495,273

[45] Date of Patent: Feb. 27, 1996

[54] IMAGE RECORDING APPARATUS HAVING SPACER BETWEEN APERTURE ELECTRODE AND OPPOSING ELECTRODE

[75] Inventor: Tetsuya Kitamura, Gifu, Japan

[73] Assignee: Brother Kogyo Kabushiki Kaisha, Aichi, Japan

[21] Appl. No.: 201,388

[22] Filed: Feb. 24, 1994

[30] Foreign Application Priority Data

Mar. 2, 1993 [JP] Japan .................................... 5-41129

[51] Int. Cl.[6] .................................................. G01D 15/06

[52] U.S. Cl. ............................................ 347/55; 347/149

[58] Field of Search ............................ 347/55, 141, 149, 347/152

[56] References Cited

U.S. PATENT DOCUMENTS

| | | | |
|---|---|---|---|
| 4,074,283 | 2/1978 | Fink et al. | 347/149 X |
| 4,257,054 | 3/1981 | Ishikawa | 347/149 |
| 4,258,372 | 3/1981 | Ishikawa | 347/149 |
| 4,573,061 | 2/1986 | Fujii et al. | 347/149 |
| 4,951,070 | 8/1990 | Theodoulou et al. | 347/149 |
| 5,036,341 | 7/1991 | Larsson | 346/154 |
| 5,132,708 | 7/1992 | Schmidlin et al. | 347/55 |
| 5,296,879 | 3/1994 | Kagayama | 347/152 X |

FOREIGN PATENT DOCUMENTS

| | | |
|---|---|---|
| 4038058A1 | 7/1991 | Germany . |
| 1-503221 | 11/1989 | Japan . |
| 3-168770 | 7/1991 | Japan . |
| 3-168769 | 7/1991 | Japan . |
| 4-265760 | 9/1992 | Japan . |

*Primary Examiner*—Robert Beatty
*Attorney, Agent, or Firm*—Oliff & Berridge

[57] ABSTRACT

An image recording apparatus having an aperture electrode and an electrically conductive opposing electrode. The aperture electrode selectively allows toners to pass. A sheet is backed by the opposing electrode, and the toner passing through the aperture electrode is attracted onto the sheet. A gap is provided between the aperture electrode and the opposing electrode by using a pair of spacers. The gap distance is greater than a minimum level to avoid puncture. The spacers are mounted on non aperture portions of the aperture electrode for supporting axially end portions of the opposing electrode or are mounted on the opposing electrode.

11 Claims, 7 Drawing Sheets

IMAGE RECORDING APPARATUS HAVING SPACER BETWEEN APERTURE ELECTRODE AND OPPOSING ELECTRODE

BACKGROUND OF THE INVENTION

The present invention relates to an image recording apparatus for use in copying machines, printers, and facsimiles, etc., and more particularly, to a type thereof in which charged toners pass through aperture electrodes to form a toner image onto an image receiving member on an opposing electrode.

A conventional image recording apparatus of this type is schematically shown in FIG. 1. The apparatus includes toner flow control means 203 having a control electrode formed with apertures 204, toner supplying means 201 for supplying toners to the toner flow control means 203, and an opposing electrode 206 for attracting toners 14 passing through apertures 204 of the toner flow control means onto an image receiving medium P such as a sheet.

For maintenance and inspection, the opposing electrode 206 is pivotally movably provided in a direction indicated by an arrow A by an arm 207 whose one end is connected to a pivot shaft 208 supported to an outer body frame (not shown). The opposing electrode 206 is of a cylindrical shape. In order to obtain high grade toner image onto the sheet P, the sheet P must be in intimate contact with the opposing electrode 206. To this effect, the sheet P is fed in a direction indicated by an arrow B with partly windingly contacting an outer peripheral cylindrical surface of the opposing electrode 206.

A gap of 0.5 mm is provided between the opposing electrode 206 and the toner flow control means 201, and high voltage such as about 1 KV is applied to the opposing electrode 206. The image receiving medium P passes through the minute gap for receiving the charged toners. The gap distance between the opposing electrode 206 and the toner flow control means 201 must be constant at all time during image recording operation. And a constant parallelism must be provided therebetween to provide the constant gap, otherwise, flying or moving loci of toners passing through the apertures 204 of the toner flow control means 203 are changed, to degrade the toner image. Further, if the gap becomes excessively small, puncture may occur between the toner flow control means 203 and the opposing electrode 206 due to the high voltage applied to the opposing electrode 206. As a result, the toner flow control means and its driving circuit may be destroyed, to render the apparatus inoperative.

However, in such a conventional image recording apparatus, the minute gap distance between the opposing electrode 206 and the toner flow control means 203 is easily changed if an outer frame body of the apparatus is vibrated. Further, since opposing electrode 206 is pivotally movably supported by the arm 207, the position of the opposing electrode 206 may be changed, so that the gap is also changed due to the force of the sheet P partly winding around the opposing electrode 206. That is, when the sheet P passes through the opposing electrode 206, the sheet P urges the opposing electrode 206 to move in a direction to change the distance between the opposing electrode 206 and the toner flow control means 203.

For example, if the sheet winding angle at upstream portion P1 of the sheet relative to the opposing electrode 206 is greater than that at downstream portion P2, the opposing electrode 206 is urged downwardly due to frictional force occurring between the sheet portion P1 and the outer surface of the opposing electrode 206. As a result, the distance of the gap is decreased, to provide a danger of the puncture.

It would be difficult to accurately support the opposing electrode 206 to the outer frame body so as to obtain the constant space relative to the toner flow control means 203 due to the requirement of high dimensional accuracy. Even if the opposing electrode 206 is directly supported to the outer frame body in an attempt to obviate the problem of relative vibration between the outer frame body and the opposing electrode, or in an attempt to avoid pivotal movement of the opposing electrode, the change in the gap distance may still occur due to minute deformation or bending of the outer frame body. Employment of extremely rigid outer frame body is costly.

Japanese Patent Application Kokai No. Hei 3-168769 discloses an image recording apparatus of this type as shown in FIGS. 2(*a*) and 2(*b*). This apparatus includes a flat control electrode 103 disposed or netted at a lower opening of a toner case 108 in which a toner carrier 101 is rotatably disposed. An opposing electrode 106 is upwardly biased by a spring 134 and is provided immediately below and in confrontation with the control electrode 103. An electrically insulative position regulating member 136 is provided at the bottom of the toner case 108 so as to regulate the vertical position of the opposing electrode 106.

A sheet guide 105 having a lower arcuate surface extends from the position regulating member 136. An image receiving medium P such as the sheet travels through a space defined between the control electrode 103 and the opposing electrode 106. In this case, various sheets having different thickness to one another can pass through the space since the opposing electrode 106 is biasedly supported by the spring 134. Further, because of the provision of the arcuate guide 105, floating of the sheet P fed to the space can be prevented.

However, since the sheet is brought into contact with the arcuate surface of the sheet guide 105, the sheet may not be smoothly passed through a space between the guide 105 and the opposing electrode 106 if the sheet does not provide sufficient rigidity. If the sheet is excessively flexible, sheet jam may occur at that space.

SUMMARY OF THE INVENTION

It is therefore, an object of the present invention to overcome the above described conventional disadvantages and drawbacks and to provide an improved image recording apparatus capable of providing a constant gap distance between the toner flow control means and the opposing electrode, and providing a smooth travel of the image receiving medium at the gap portion.

Another object of the present invention is to provide such an image recording apparatus in which high quality toner image with a prolonged stability can be provided.

These and other objects of the present invention will be attained by providing an image recording apparatus for forming a toner image on an image receiving medium including an outer frame body, toner flow control means, toner supplying means, an opposing electrode and spacer means. The toner flow control means is disposed in the outer frame body for selectively allow toners to pass therethrough. The toner supplying means is disposed in the outer frame body and positioned nearby the toner flow control means for supplying charged toners to the toner flow control means. The opposing electrode is disposed in the outer frame body and is positioned in facing relation to the toner flow control means for guiding the image receiving medium and attracting toners passed through the toner flow control means onto the image receiving medium. The spacer means is provided at a position between the toner flow control means and the opposing electrode for providing a given gap between the toner flow control means and the opposing electrode. The image receiving medium is interposed between exclusively the opposing electrode and the toner flow control means.

BRIEF DESCRIPTION OF THE DRAWINGS

In the drawings;

FIG. 2(*b*) is a cross-sectional taken along the line II—II of FIG. 2(*a*);

FIG. 5(*b*) is a cross-sectional view taken along the line V—V of FIG. 5(*a*);

FIG. 6(*b*) is a cross-sectional view taken along the line VI—VI of FIG. 6(*a*);

FIG. 7(*b*) is a cross-sectional view taken along the line VII—VII of FIG. 7(*a*);

FIG. 8(*b*) is a cross-sectional view taken along the line VIII—VIII of FIG. 8(*a*)

DETAILED DESCRIPTION OF THE PREFERRED EMBODIMENTS

Figure 1:
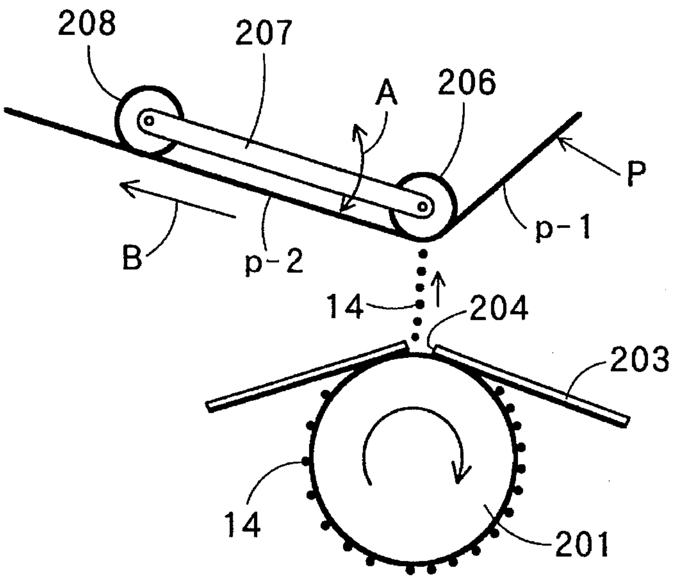
FIG. 1 PRIOR ART
FIG. 1 is a schematic view showing one conventional image recording apparatus having toner flow control means and an opposing electrode.
Figure 2:
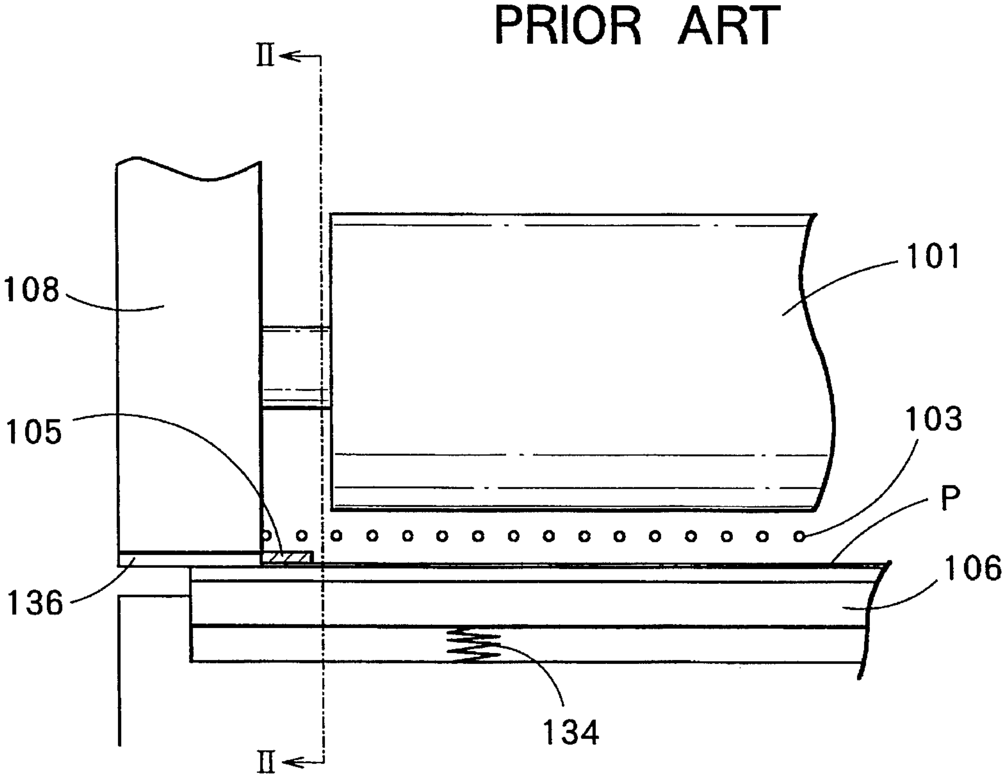
FIG. 2 (a) PRIOR ART
FIG. 2(*a*) is a schematic front view showing another conventional image recording apparatus.
Figure 2:
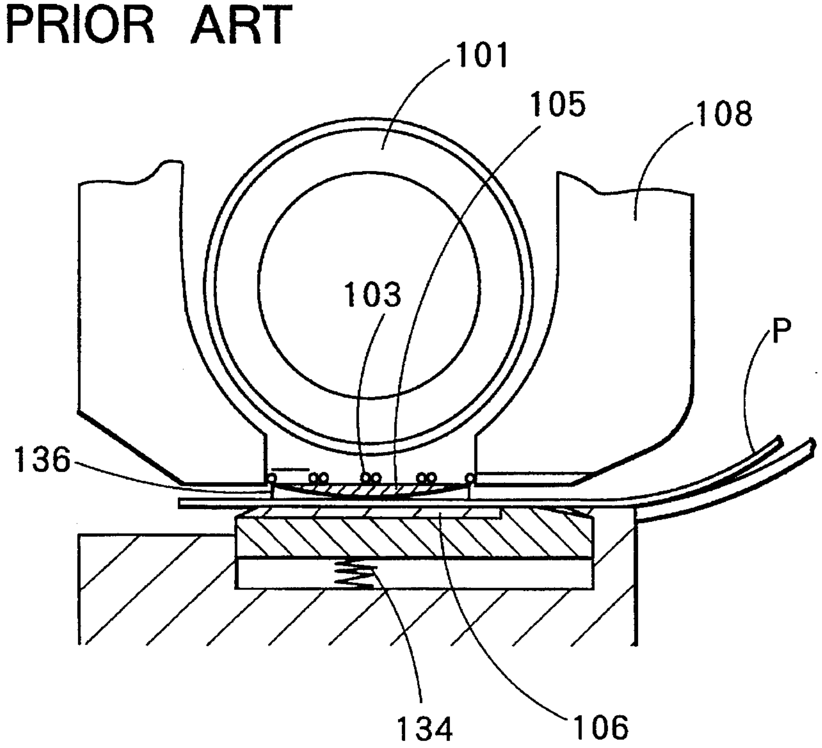
FIG. 2 (b) PRIOR ART
Figure 3:
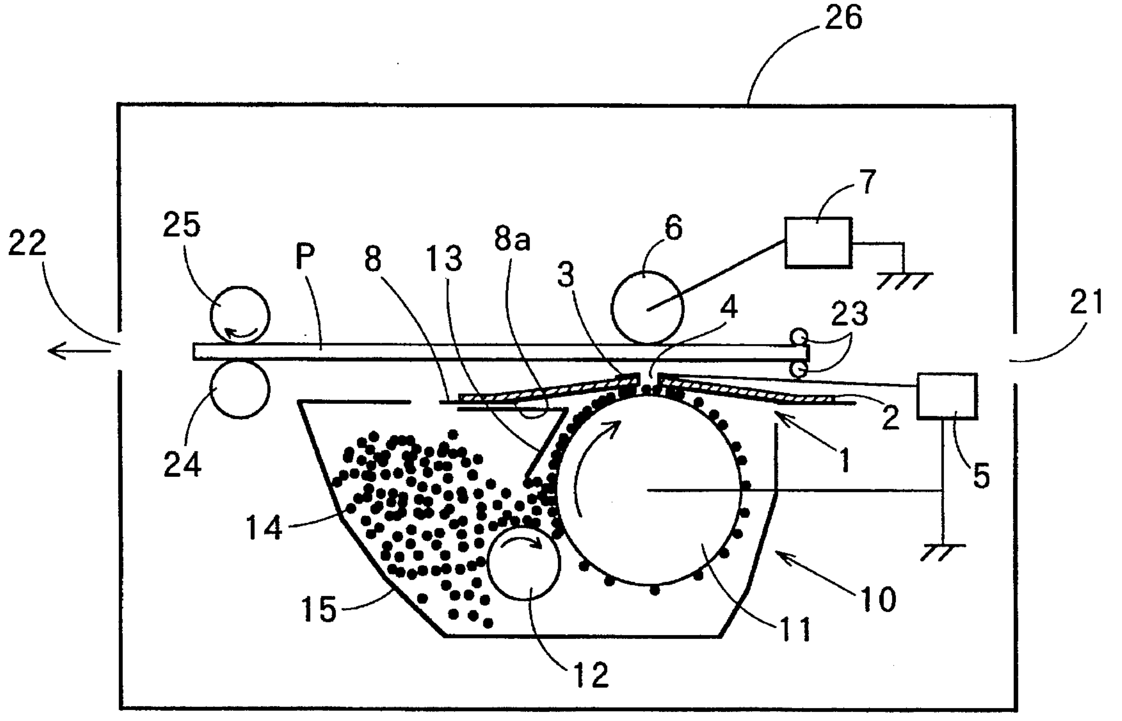
FIG. 3 is a schematic side sectional view showing an image recording apparatus to which the present invention is embodied.
Figure 4:
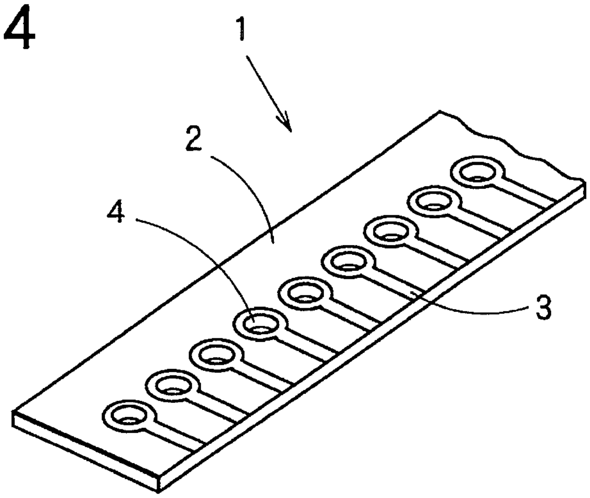
FIG. 4 is a perspective view showing an aperture electrode serving as toner flow control means used in the present invention.
Figure 5:
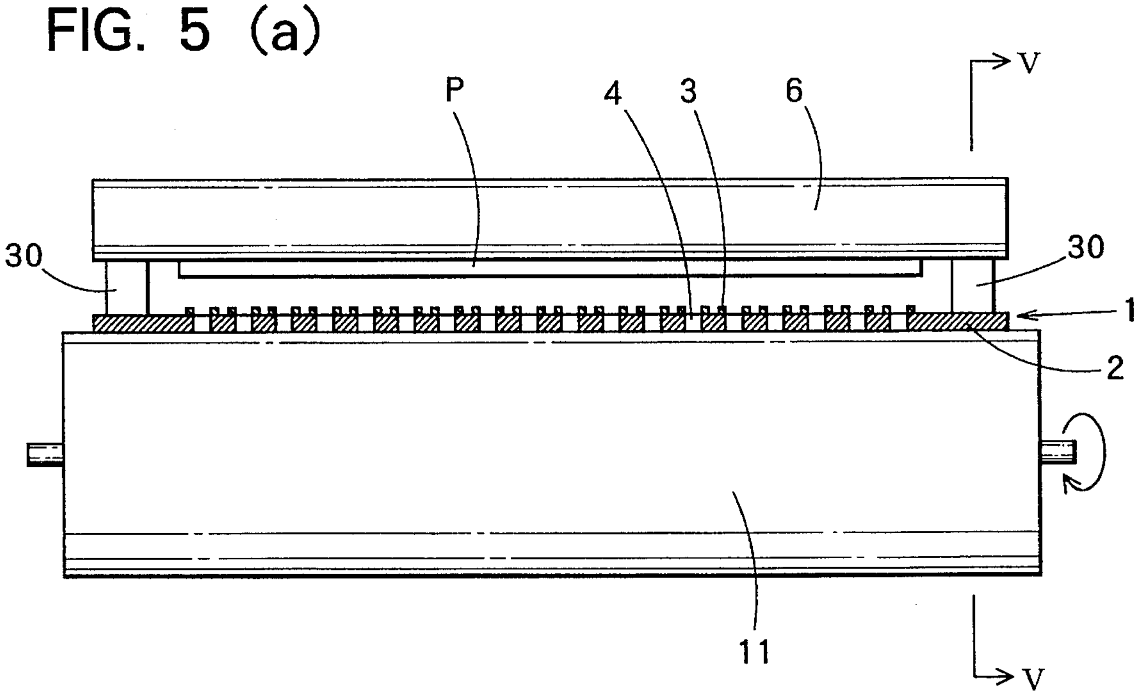
FIG. 5(*a*) is a schematic front view showing an essential portion of the image recording apparatus according to a first embodiment of this invention.
Figure 5:
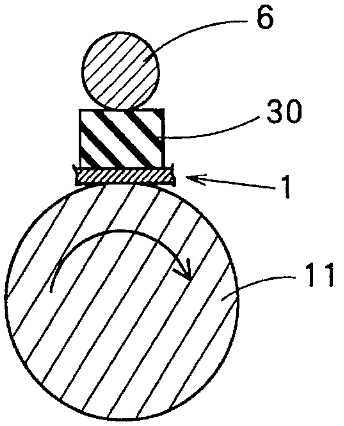

An image recording apparatus according to a first embodiment of the present invention will be described with reference to FIGS. 3 through 5(*b*). The apparatus includes an outer frame body 26 having a sheet inlet 21 and a sheet outlet 22 for inserting and discharging an image receiving medium such as a sheet like member P into and out of the outer frame body 26. Inside the outer frame body 26, there are provided an aperture electrode 1 serving as toner flow control means, a cylindrical opposing electrode roller 6 serving as an opposing electrode, and a toner supplying unit 10.

The toner supplying unit 10 is detachably disposed at a lower part in the outer frame body 26. This unit 10 includes a toner case 15, a toner carrier roller 11, a toner supply roller 12 and a blade 13. The toner case 15 has a top table 8 formed with an opening **8*a* to expose a part of the toner carrier roller 11. The toner case 15 contains therein toners 14**.

The toner carrier roller 11 is rotatably supported by and disposed in the toner case 15, and is grounded. The toner carrier roller 11 is formed of aluminum and has a diameter of 20 mm. Outer peripheral surface of the toner carrier roller 11 is toughened to a surface roughness of several microns by blasting in which grinding particles or metal particles are sprayed to the outer surface so as to increase toner retainability at the toughened surface. The toner supply roller 12 is rotatably supported by the toner case 15 and positioned nearby the toner carrier roller 11 for supplying toners 14 to the toner carrier roller 11. The blade 13 is positioned in contact with the toner carrier roller 11 for scraping excessive toner from the surface of the toner carrier roller 11.

The aperture electrode 1 is disposed on the top table 8, and is in contact with the part of the toner carrier roller 11, the part being protruded from the opening **8*a* of the top table 8. As best shown in FIG. 4, the aperture electrode 1 includes an electrically insulating layer 2 and a plurality of control electrodes 3 provided upon the insulating layer 2 and arrayed in line. A plurality of apertures 4 are formed to penetrate the control electrodes 3 and the insulating layer 2. Thus, the control electrodes 3 are disposed around the apertures 4**.

The insulating layer 2 is formed of a polymer film such as a polyimide and has a thickness of 25 micron meters. The control electrodes 3 are made of a metal film such as copper film formed by sputtering and having a thickness of 1 micron meter. Each of the apertures 4 has a diameter of 80 micron meters provided that the image recording density is 300 dpi (dot per inch).

A voltage applying circuit 5 is provided for applying voltage to each of the control electrodes 3. This circuit selectively applies toner passable voltage of +70 V and toner blocking voltage of −30 V to selected control electrodes 4.

The cylindrical opposing electrode 6 is positioned above the aperture electrode 1 and is made of an electrically conductive material such as aluminum. The opposing electrode 6 is supported, by its own weight, on the aperture electrode 1 through a pair of spacers 30. A power source 7 is provided to supply +1 KV to the opposing electrode 6.

The spacers 30 are of rectangular shape and have thickness of 0.5 mm. Each of the spacers 30 is attached to non apertured areas of the aperture electrode 1, that is, at positions outside a leftmost and rightmost apertures as shown in FIG. 5(*a*). The axial length of the cylindrical opposing electrode 6 is greater than a width of the image receiving member P as best shown in FIG. 5(*a*) and is also greater than an image recording area, that is, greater than a length of array of the apertures 4. Therefore, axially end portions of the opposing electrode 6 are directly supported onto the spacers 30 extending from the non-apertured areas of the aperture electrode 1. In order to provide a smooth sliding relationship between the rotatable opposing electrode 6 and the spacers 30, the spacers 30 are made of a material having a low coefficient of friction such as Teflon (DuPont trademark applied to polymers of tetrafluoroethylene). As a result, the opposing electrode 6 can be smoothly rotated on the spacers 30, to smoothen the transfer of the image recording medium P.

As described above, the aperture electrode 1 is mainly constituted from polyimide having thickness of 25 micron meters, which is too flexible to solely support the opposing electrode 6. However, since the aperture electrode 1 is also supported on the toner carrier roller 11 in addition to the support on the top table 8 as shown in FIG. 3, the aperture electrode 1 can ultimately support the opposing electrode 6.

Thus, a space of 0.5 mm is provided between the opposing electrode 6 and the aperture electrode 1 by the spacers 30. Accordingly, the image receiving member P can pass through the space.

A pair of guide rollers 23 are rotatably provided at a position upstream of the image recording area for supplying the image receiving medium P supplied from the inlet 21. The guide rollers 23 are positioned in such a manner that the image receiving medium P can be brought into contact with the opposing electrode 6. At a position downstream of the image recording area, a heat roller 24 and a press roller 25 are rotatably provided for fixing the toner image formed at the image recording area. The heat roller 24 accommodates therein a heat source (not shown), and the press roller 25 is in nipping relation to the heat roller 24.

In operation, in the toner supplying unit 10, toners 14 accumulated in the toner case 15 is supplied to the toner carrier roller 11 by the toner supply roller 12. In the toner transfer portion between the rollers 11 and 12, the toner is negatively charged because of the triboelectrification. The charged toners 14 are triboelectrically attached to the toner carrier roller 11, and transferred, through the blade 13, to the opening 8*a* of the table 8 because of the rotation of the toner carrier roller 11. The blade 13 provides a toner layer having a uniform thickness over the toner carrier roller 11, the thickness being equal to one or two particle sizes of the toner(s).

The negatively charged toners 14 supplied to a position in confrontation with the apertures 4 of the aperture electrode 1 are subjected to selective passing through the apertures 4 in accordance with the level of the voltage applied from the control voltage applying circuit 5 to the control electrodes 3. More specifically, if +70 V is applied, as the toner passable voltage, to the control electrodes 3 from the control voltage applying circuit 5, electrical field is generated at a position between the grounded toner carrier roller 11 and the control electrodes 3, so that the negatively charged toners 14 can pass through the associated apertures 4. On the other hand, if −20 V is applied, as the toner blocking voltage, to the control electrodes 3, another electrical field is generated between the grounded toner carrier roller 11 and the control electrodes 3, so that the negatively charged toners 14 cannot pass through the associated apertures 4.

The image receiving medium P inserted through the inlet 21 is directed to the opposing electrode 6 by means of the pair of guide rollers 23. Since the opposing electrode 6 is applied with high voltage (+1 KV) from the power source 7, and since the opposing electrode 6 is spaced from the aperture electrode 1 by 0.5 mm by the spacers 30, +2 KV/mm electrical field is generated between the opposing electrode 6 and the aperture electrode 1. By this electrical field, toners 14 passing through the apertures 4 are attracted toward the opposing electrode 6. Thus, toners 14 are linearly attached to the image receiving medium P. Because of the successive transfer of the image receiving medium P, a toner image is formed on the medium P.

During movement of the medium P toward the outlet 22, the medium P is nipped between the heat roller 24 and the press roller 25. Thus, the toner image on the medium P can be thermally fixed. Then, the medium P finally reaches the outlet 22.

As described above, in the first embodiment of the invention, gap distance between the opposing electrode 6 and the toner flow control means 1 is made constant by means of the spacers 30 even if external force such as vibration is imparted to the image recording apparatus. That is, the opposing electrode 6 is supported on the spacers 30 supported on the aperture electrode 1, which is supported on the table 8 and the toner carrier roller 11. The toner carrier roller 11 is supported in the toner case 15, and the table 8 is a part of the toner case 5, and the toner case 15 is supported on the outer frame body 26. Thus, even if the outer frame body 26 undergoes vibration, the table 8, the toner carrier roller 11, the aperture electrode 1, the spacers 30 and the opposing electrode 6 are integrally vibrated. Accordingly, distance between the aperture electrode 1 and the opposing electrode 6 can be maintained unchanged. Accordingly uniform moving loci of toners result, thereby obtaining a stabilized toner image. Further, since the gap distance between the aperture electrode 1 and the opposing electrode 6 cannot become smaller than the thickness of the spacers 30, the problem of puncture between these electrodes 1 and 6 can be obviated. Thus, breakdown of the electrodes 1 and its driving circuit can be prevented, and high quality output image can be stably provided.

Figure 6:
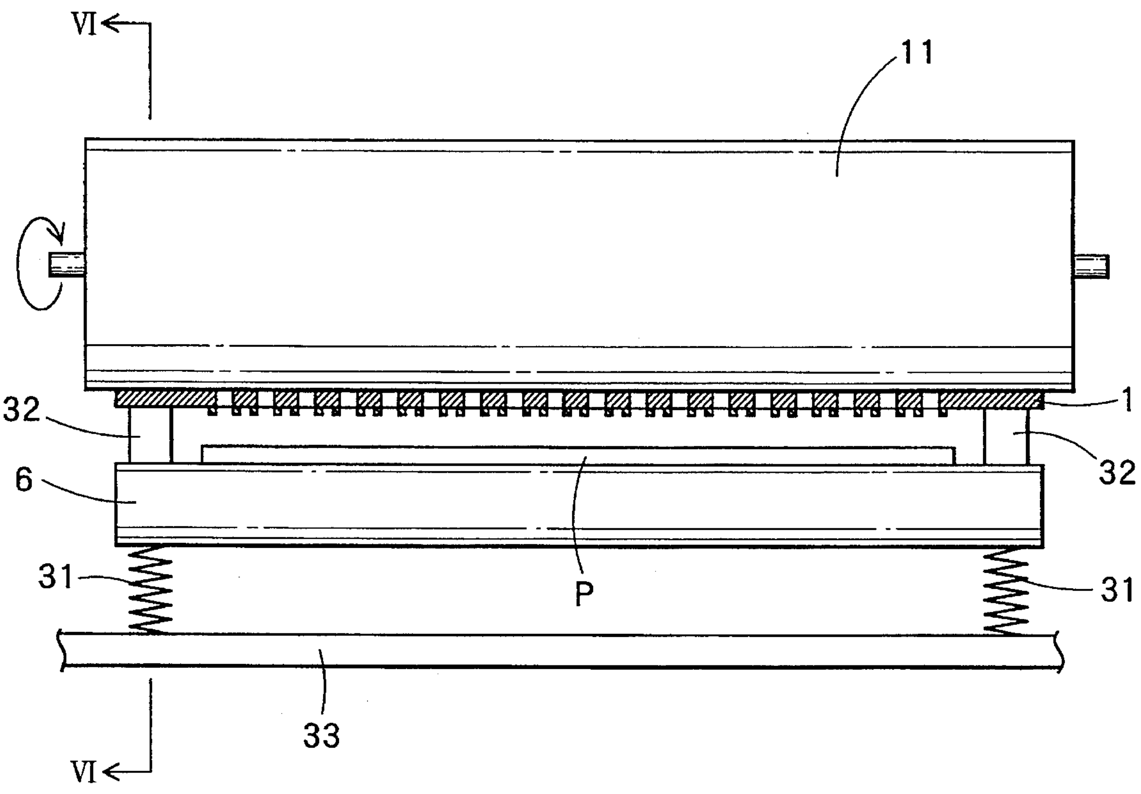
FIG. 6(*a*) is a schematic front view showing an essential portion of an image recording apparatus according to a second embodiment of this invention.
Figure 6:
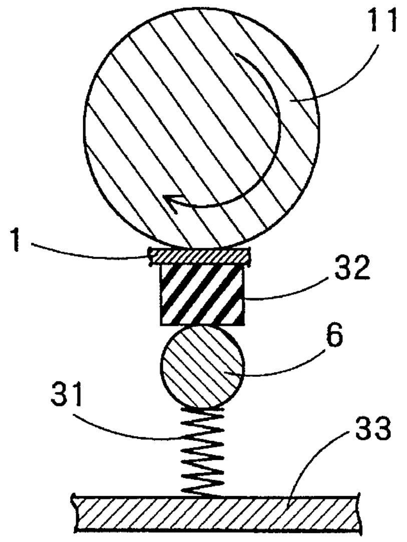

An image recording apparatus according to a second embodiment of this invention will be described with reference to FIGS. 6(*a*) and 6(*b*). In the second embodiment, the opposing electrode 6 is positioned below the aperture electrode 1. That is, the positional relationship among the components in the first embodiment are all reversed in a vertical direction. In order to support the opposing electrode 6 in a position, urging pieces 31 such as coil springs are interposed between a chassis 33 of the outer frame body 26 and the axially end portions of the opposing electrode 6. Thus, the opposing electrode 6 is urged toward the aperture electrode 1, yet constant gap is provided between the electrodes 1 and 6 by the interposition of the spacers 32, 32.

Figure 7:
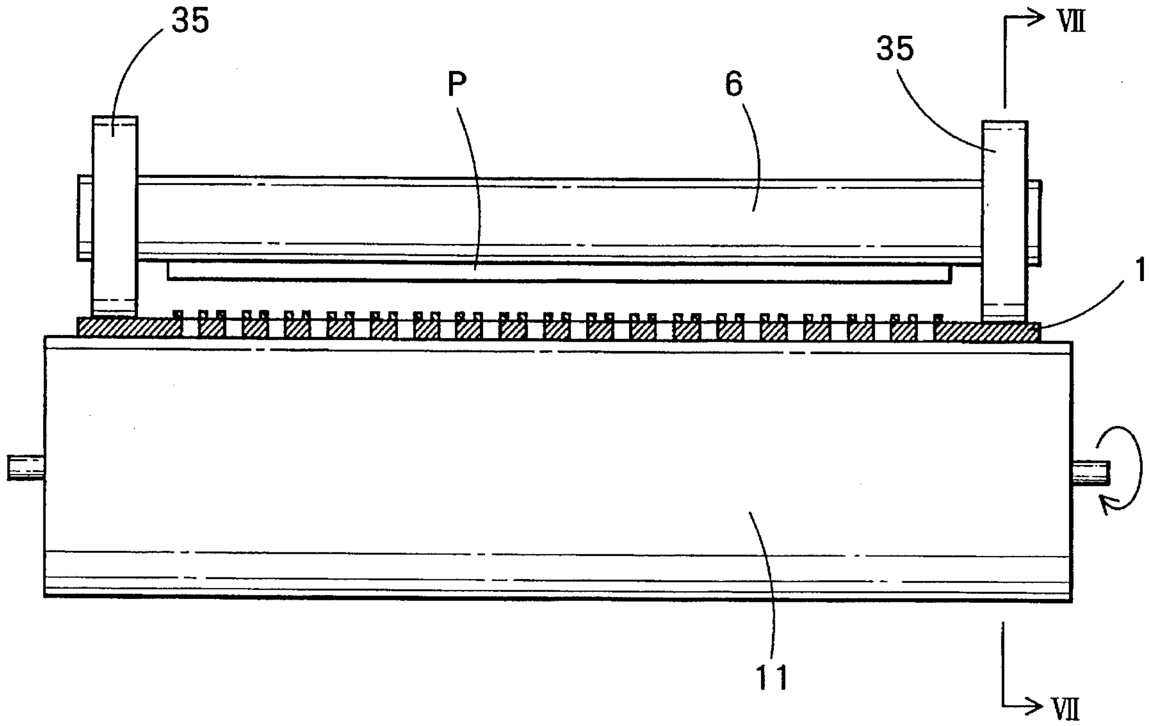
FIG. 7(*a*) is a schematic front view showing an essential portion of an image recording apparatus according to a third embodiment of this invention.
Figure 7:
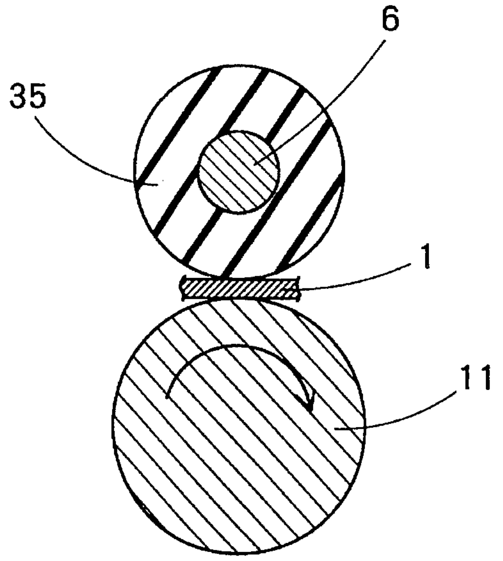

FIGS. 7(*a*) and 7(*b*) show a third embodiment, in which spacers are not attached to the aperture electrode in contrast to the foregoing embodiments, but are provided to the opposing electrode 6. That is, a pair of disc shaped spacers 35 are integrally and coaxially mounted on an axially end portion of the opposing electrode 6. When the opposing electrode 6 is rotated about its axis, the disc shaped spacers 35 are also rotated in sliding contact with the non-apertured portion of the aperture electrode 1, if the disc shaped spacers 35 are provided integrally with the opposing electrode 6. Alternatively, it is possible to render the opposing electrode 6 rotatable relative to the disc shaped spacers 35.

Figure 8:
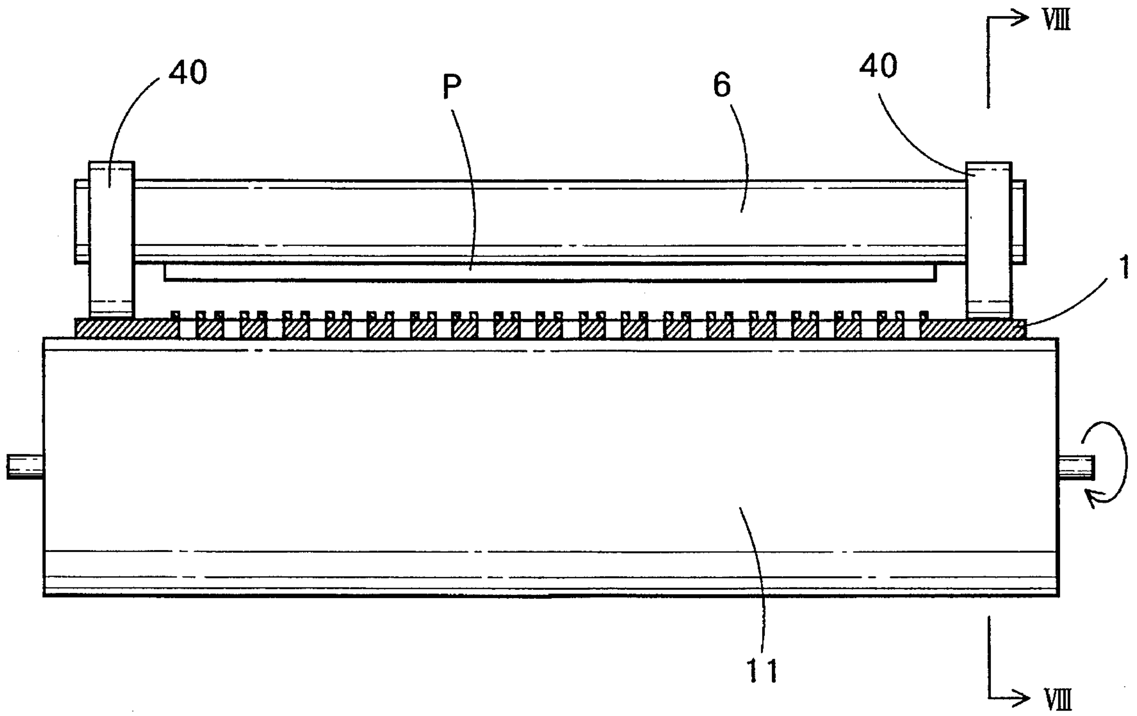
FIG. 8(*a*) is a schematic front view showing an essential portion of an image recording apparatus according to a modification to the third embodiment.
Figure 8:
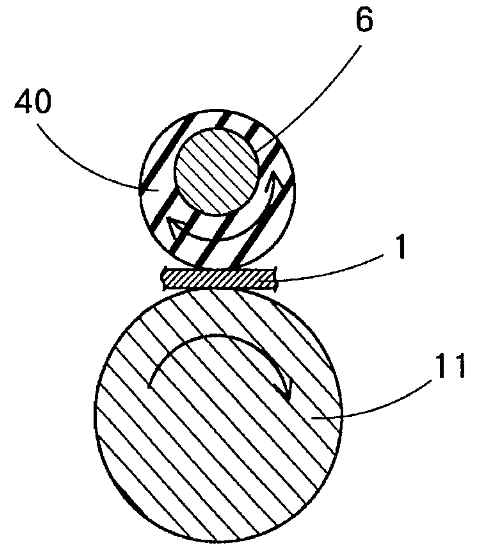

FIGS. 8(*a*) and 8(*b*) show a modification to the third embodiment. In the modification, the disc shaped spacers 40 are not coaxially mounted to the opposing electrode 6, but are eccentrically mounted thereto. With the structure, distance between the opposing electrode 6 and the aperture electrode 1 is changed in response to the rotation of the disc 40, so as to change intensity of electrical field bridging therebetween, to thereby change recorded dot diameter, to thus intentionally change imaging quality. Method for intentionally changing imaging quality is described in a Japanese Patent Application Kokai No. Hei 4-265760.

Figure 9:
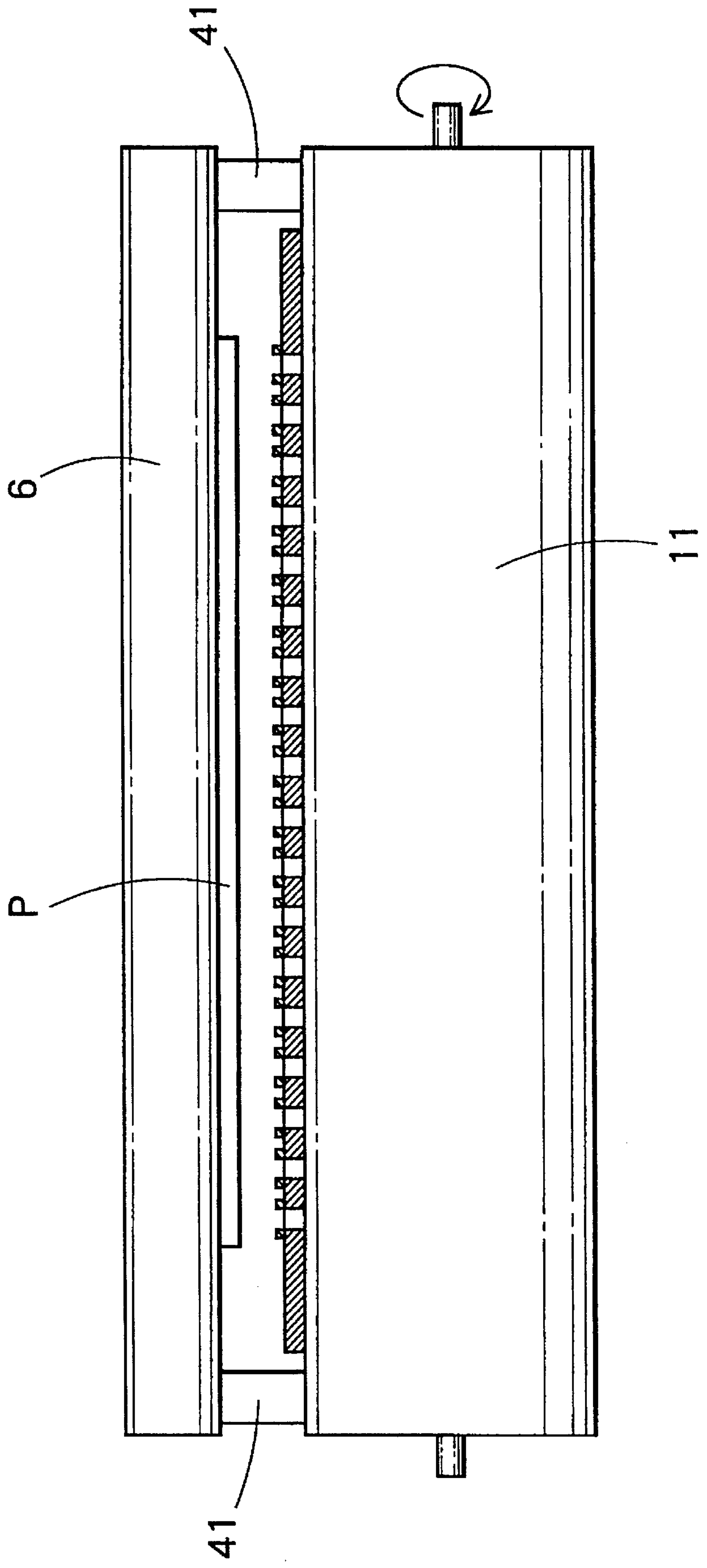
FIG. 9 is a schematic front view showing an essential portion of an image recording apparatus according to a fourth embodiment of the present invention.

As a fourth embodiment, as shown in FIG. 9, the spacers 41 can be directly mounted on the toner carrier roller 11 without interposition of the aperture electrode 1, and the opposing electrode 6 can be directly mounted on the spacers 41. In this case, the aperture electrode 1 is positioned within a space defined between the pair of spacers 41.

While the invention has been described in detail and with reference to specific embodiments thereof, it would be apparent to those skilled in the art that various changes and modifications may be made therein without departing from the spirit and scope of the invention.

For example, in the illustrated embodiments, roller type opposing electrode is employed. However, it would be possible to use a plate type opposing electrode.

Moreover, in the illustrated embodiments, single component type chargeable toners are accumulated in the toner supplying unit to provide a charged thin toner layer on the toner carrier roller. However, it would be also possible to employ two-components type toners in which carriers and toners are mixed together.

Furthermore, in the illustrated embodiments, as the toner flow control means, the aperture electrode is employed in which apertures are formed in the insulating layer. However, it is possible to use a mesh type electrode as disclosed in U.S. Pat. No. 5,036,341.

What is claimed is:

1. An image recording apparatus for forming a toner image on an image receiving medium comprising:

an outer frame body;

toner flow control means disposed in the outer frame body for selectively allowing toners to pass therethrough, the toner flow control means comprising an aperture electrode having a plurality of aperture array portions and non-aperture portions;

toner supplying means disposed in the outer frame body and positioned nearby the toner flow control means for supplying charged toners to the toner flow control means;

an opposing electrode disposed in the outer frame body and positioned in facing relation to the toner flow control means for guiding the image receiving medium and attracting toners passing through the toner flow control means onto the image receiving medium, the opposing electrode being positioned above the aperture electrode; and spacer means provided at a position between the toner flow control means and the opposing electrode for providing a given gap between the toner flow control means and the opposing electrode, the image receiving medium being interposed between exclusively the opposing electrode and the toner flow control means, the spacer means comprising a pair of spacer members formed of a material having low friction coefficient, the distance between the spacer members being greater than a width of the image receiving medium passing through the gap, wherein each of the spacer members is of rectangular shape and positioned on and attached to the non aperture portion of the aperture electrode to support thereon each end portion of the opposing electrode.

2. An image recording apparatus as claimed in claim 1, wherein the toner supplying means comprises:

a toner case supported in the outer frame body, the toner case having a top table in which an opening is formed; and a toner carrier roller rotatably provided in the toner case for forming a toner layer on its outer peripheral surface, a part of the outer peripheral surface being protrudable from the opening.

3. An image recording apparatus as claimed in claim 2, wherein the aperture array portions are supported on the part of the outer peripheral surface of the toner carrier roller, and the non aperture portions being supported on the top table.

4. An image recording apparatus as claimed in claim 3, wherein a distance of the gap is 0.5 mm.

5. An image recording apparatus for forming a toner image on an image receiving medium comprising:

an outer frame body;

toner flow control means disposed in the outer frame body for selectively allowing toners to pass therethrough, the toner flow control means comprising an aperture electrode having a plurality of aperture array portions and non-aperture portions;

toner supplying means disposed in the outer frame body and positioned nearby the toner flow control means for supplying charged toners to the toner flow control means;

an opposing electrode disposed in the outer frame body and positioned in facing relation to the toner flow control means for guiding the image receiving medium and attracting toners passing through the toner flow control means onto the image receiving medium, the opposing electrode being positioned above the aperture electrode; and spacer means provided at a position between the toner flow control means and the opposing electrode for providing a given gap between the toner flow control means and the opposing electrode, the image receiving medium being interposed between exclusively the opposing electrode and the toner flow control means, the spacer means comprising a pair of spacer members formed of a material having low friction coefficient, the distance between the spacer members being greater than a width of the image receiving medium passing through the gap, wherein each of the spacer members is of a circular shape having a peripheral surface and provided to each end portion of the opposing electrode, the peripheral surface of each spacer member being in contact with the non aperture portions of the aperture electrode.

6. An image recording apparatus as claimed in claim 5, wherein the circular spacer members are provided coaxially with the opposing electrode.

7. An image recording apparatus as claimed in claim 5, wherein the circular spacer members are provided eccentrically with the opposing electrode.

8. An image recording apparatus for forming a toner image on an image receiving medium comprising:

an outer frame body;

toner flow control means disposed in the outer frame body for selectively allowing toners to pass therethrough, the toner flow control means comprising an aperture electrode having a plurality of aperture array portions and non-aperture portions;

toner supplying means disposed in the outer frame body and positioned nearby the toner flow control means for supplying charged toners to the toner flow control means, the toner supplying means comprising:

a toner case supported in the outer frame body, the toner case having a top table in which an opening is formed, and a toner carrier roller rotatably provided in the toner case for forming a toner layer on its outer peripheral surface, a part of the outer peripheral surface being protrudable from the opening;

an opposing electrode disposed in the outer frame body and positioned in facing relation to the toner flow control means for guiding the image receiving medium and attracting toners passing through the toner flow control means onto the image receiving medium, the opposing electrode being positioned above the aperture electrode; and spacer means provided at a position between the toner flow control means and the opposing electrode for providing a given gap between the toner flow control means and the opposing electrode, the image receiving medium being interposed between exclusively the opposing electrode and the toner flow control means, the spacer means comprising a pair of spacer members formed of a material having low friction coefficient, the distance between the spacer members being greater than a width of the image receiving medium passing through the gap, wherein each of the spacer members is of rectangular shape and positioned directly on each end portion of the toner carrier roller.

9. An image recording apparatus for forming a toner image on an image receiving medium comprising:

an outer frame body;

toner flow control means disposed in the outer frame body for selectively allowing toners to pass therethrough, the toner flow control means comprising an aperture electrode having a plurality of aperture array portions and non-aperture portions;

toner supplying means disposed in the outer frame body and positioned nearby the toner flow control means for supplying charged toners to the toner flow control means;

an opposing electrode disposed in the outer frame body and positioned in facing relation to the toner flow control means for guiding the image receiving medium and attracting toners passing through the toner flow control means onto the image receiving medium; and spacer means provided at a position between the toner flow control means and the opposing electrode for providing a given gap between the toner flow control means and the opposing electrode, the image receiving medium being interposed between exclusively the opposing electrode and the toner flow control means, the spacer means comprising a pair of spacer members, the distance between the spacer members being greater than a width of the image receiving medium passing through the gap, wherein the opposing electrode is positioned below the aperture electrode, each of the spacer members being positioned on each end portion of the opposing electrode, and in contact with the non aperture portion of the aperture electrode.

10. An image recording apparatus as claimed in claim 9, further comprising a pair of biasing means for biasing each end portion of the opposing electrode toward the aperture electrode.

11. An image recording apparatus as claimed in claim 10, wherein a distance of the gap is 0.5 mm.

* * * * *